(12) United States Patent
Liu

(10) Patent No.: US 7,083,175 B1
(45) Date of Patent: Aug. 1, 2006

(54) FRONT FORK SWIVEL CONTROL STRUCTURE OF A JOGGING STROLLER

(76) Inventor: Ssu-Liu Liu, 2F., No. 44, Lane 11, Kuang Fu N. Rd., Taipei (TW)

( * ) Notice: Subject to any disclaimer, the term of this patent is extended or adjusted under 35 U.S.C. 154(b) by 0 days.

(21) Appl. No.: 11/305,011

(22) Filed: Dec. 19, 2005

(51) Int. Cl.
B60B 33/00 (2006.01)

(52) U.S. Cl. .................. 280/47.38; 280/647; 280/658; 16/35 R

(58) Field of Classification Search ............ 280/47.41, 280/642, 641, 38, 657, 658, 47.34, 47.38, 280/647, 648; 16/35 R, 35 D, 18 R
See application file for complete search history.

(56) References Cited

U.S. PATENT DOCUMENTS

| 5,590,896 | A  | * | 1/1997  | Eichhorn ..................... 280/642 |
| 5,660,435 | A  | * | 8/1997  | Eichhorn ................ 297/219.12 |
| 5,669,624 | A  | * | 9/1997  | Eichhorn ..................... 280/642 |
| 6,315,309 | B1 | * | 11/2001 | Li et al. .................. 280/47.38 |
| 6,402,166 | B1 | * | 6/2002  | Chiu ....................... 280/47.38 |
| 6,449,801 | B1 | * | 9/2002  | Durrin ........................... 16/47 |
| 6,671,926 | B1 | * | 1/2004  | Huang ........................ 16/35 R |
| 6,779,804 | B1 | * | 8/2004  | Liu ......................... 280/47.38 |
| 2005/0121865 | A1 | * | 6/2005 | Liao ........................... 280/38 |

* cited by examiner

Primary Examiner—J. Allen Shriver
(74) Attorney, Agent, or Firm—Troxell Law Office, PLLC

(57) ABSTRACT

A front fork swivel control structure used in a jogging stroller is disclosed to use a button to control the position of a spring-supported locking shaft, for enabling the locking shaft to be selectively shifted between the locking position to lock the front fork to the front frame tube of the jogging stroller and to prohibit the front wheel from a swivel motion, and the unlocking position to unlock the front fork from the front frame tube for allowing a swivel motion of the front wheel. The button is operable with the foot when the user's hands are not free.

1 Claim, 7 Drawing Sheets

US 7,083,175 B1

FRONT FORK SWIVEL CONTROL STRUCTURE OF A JOGGING STROLLER

BACKGROUND AND SUMMARY OF THE INVENTION

The present invention relates to a jogging stroller and more specifically, to the front fork swivel control structure of a jogging stroller, which can conveniently be adjusted to selectively lock or unlock the front fork.

FIG. 1 illustrates a jogging stroller 9 according to the prior art. According to this design, the front fork 91 of the jogging stroller 9 is fixedly secured to the stroller frame. This design has drawbacks. When jogging, the steering direction of the front wheel cannot be changed freely and quickly. There are known jogging strollers in which the front fork is swivel and can be locked by a lock pin. However, these jogging strollers produce much noise when moving over an uneven road surface.

U.S. Pat. No. 6,779,804 discloses a jogging stroller, which provides a front wheel mounting structure that allows the user to unlock the front fork, for enabling the front wheel to be freely moved in different directions. This design is functional. However, when unlocking the front fork, the user must bend the body to access to the lock pin. It is inconvenient to unlock the front fork if the user is holding things in hand.

The present invention has been accomplished to provide a jogging stroller, which eliminates the aforesaid drawbacks. According to one aspect of the present invention, the front fork swivel control structure is used in a jogging stroller, having a button adapted to control the position of a spring-supported locking shaft, for enabling the locking shaft to be selectively shifted between the locking position to lock the front fork to the front frame tube of the jogging stroller and to prohibit the front wheel from a swivel motion, and the unlocking position to unlock the front fork from the front frame tube for allowing a swivel motion of the front wheel. The button is operable with the foot when the user's hands are not free.

According to another aspect of the present invention, the user can selectively control the front wheel between the swivel position and the non-swivel position subject to different conditions as desired.

According to still another aspect of the present invention, the user needs not to bend the body and can directly use the foot to operate the button to lock/unlock the front fork if the hands are not free.

DETAILED DESCRIPTION OF THE INVENTION

Figure 1:
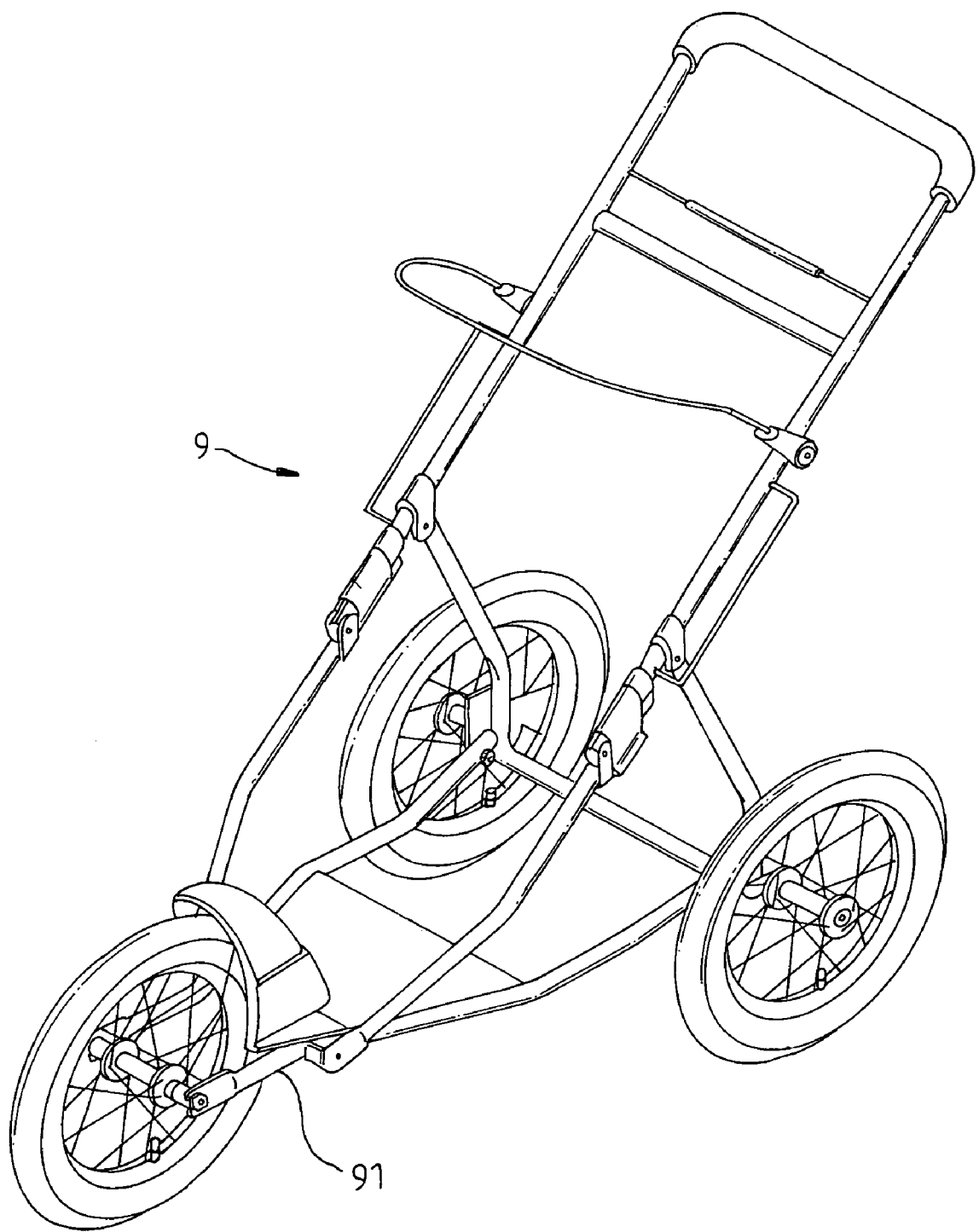
FIG. 1 is perspective view of a jogging stroller according to the prior art.
Figure 2:
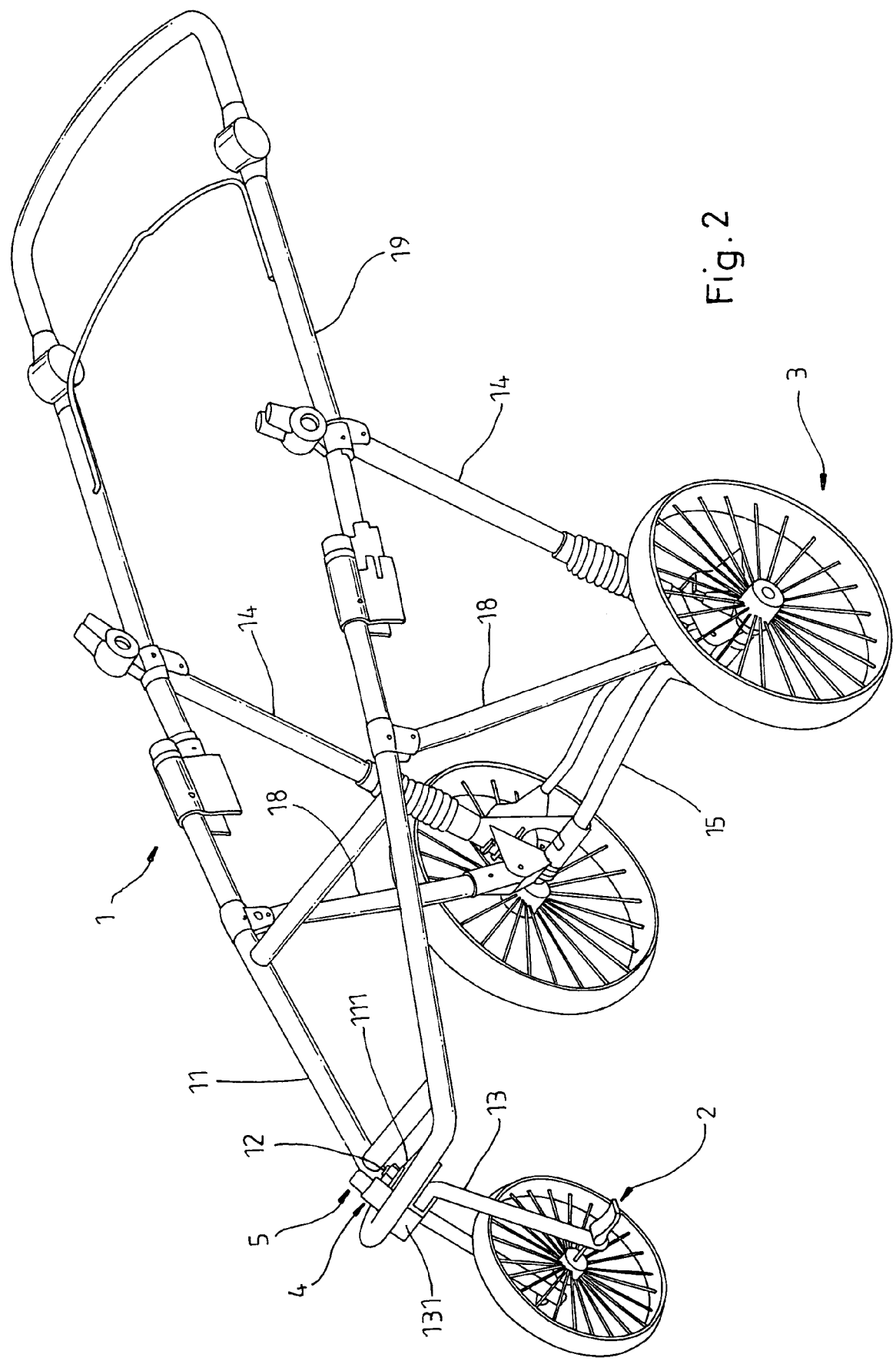
FIG. 2 is a perspective view of a jogging stroller according to the present invention.
Figure 3:
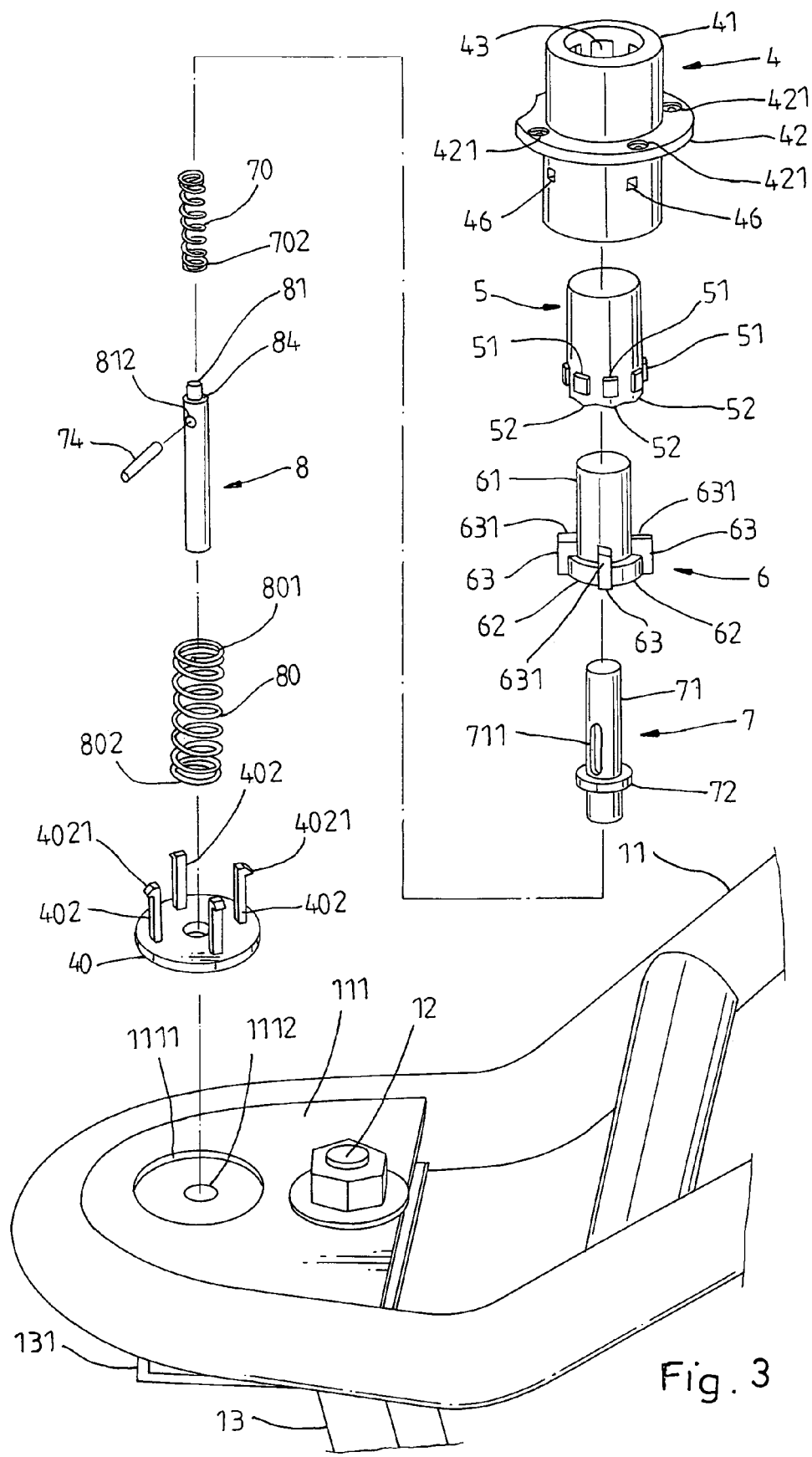
FIG. 3 is an exploded view of the front fork swivel control structure used in the jogging stroller according to the present invention.

Referring to FIGS. 2~7, a jogging stroller 1 is shown comprising a front frame tube 11, a handlebar 19 coupled to the ends of the front frame tube 11, two rear frame tubes 14 respectively pivoted to the ends of the handlebar 19 and spaced from the front frame bar 11, a front fork 13, which has a head 131 pivoted to a fixed hollow mounting frame 111 at the front side of the front frame tube 11 by a pivot 12 and carrying a 12 inch front wheel 2 below the front frame tube 11, a rear wheel axle 15 coupled between the rear frame tubes 14 and carrying a pair of 15.5 inch rear wheels 3 at the ends, and two side frame tubes 18 bilaterally coupled between the two ends of the front frame tube 11 and the bottom ends of the rear frame tubes 14.

Figure 4:
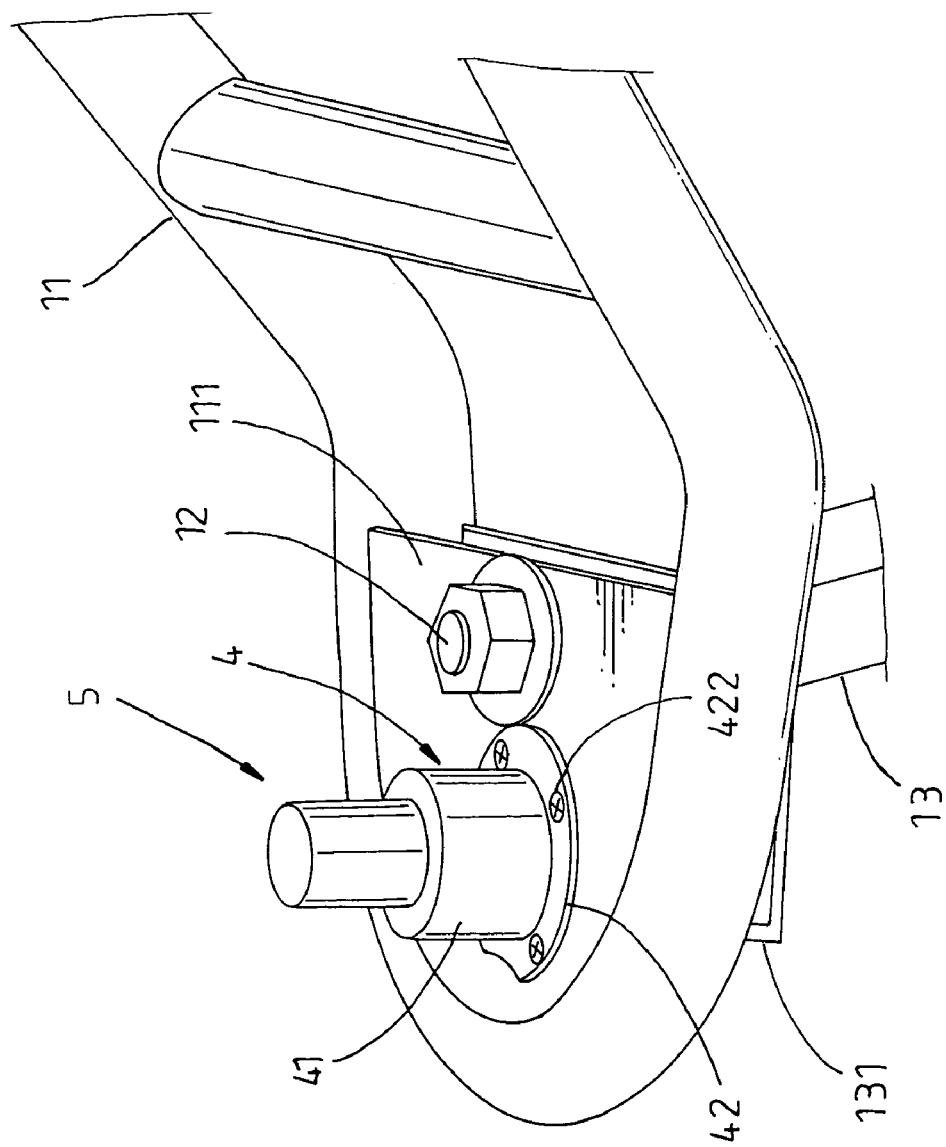
FIG. 4 is an elevational assembly view of FIG. 3.
Figure 5:
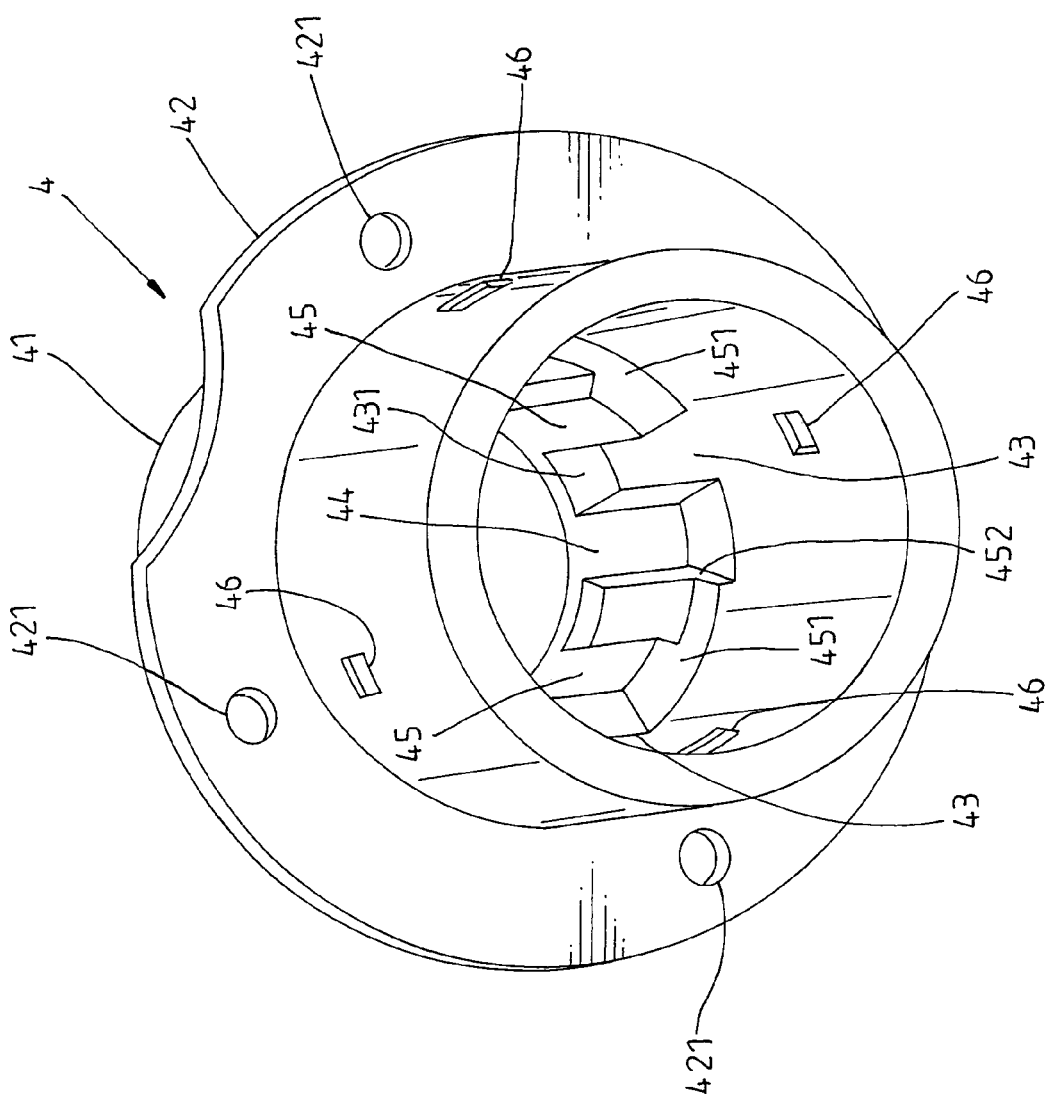
FIG. 5 is an oblique bottom elevation of the holder for the front fork swivel control structure according to the present invention.
Figure 6:
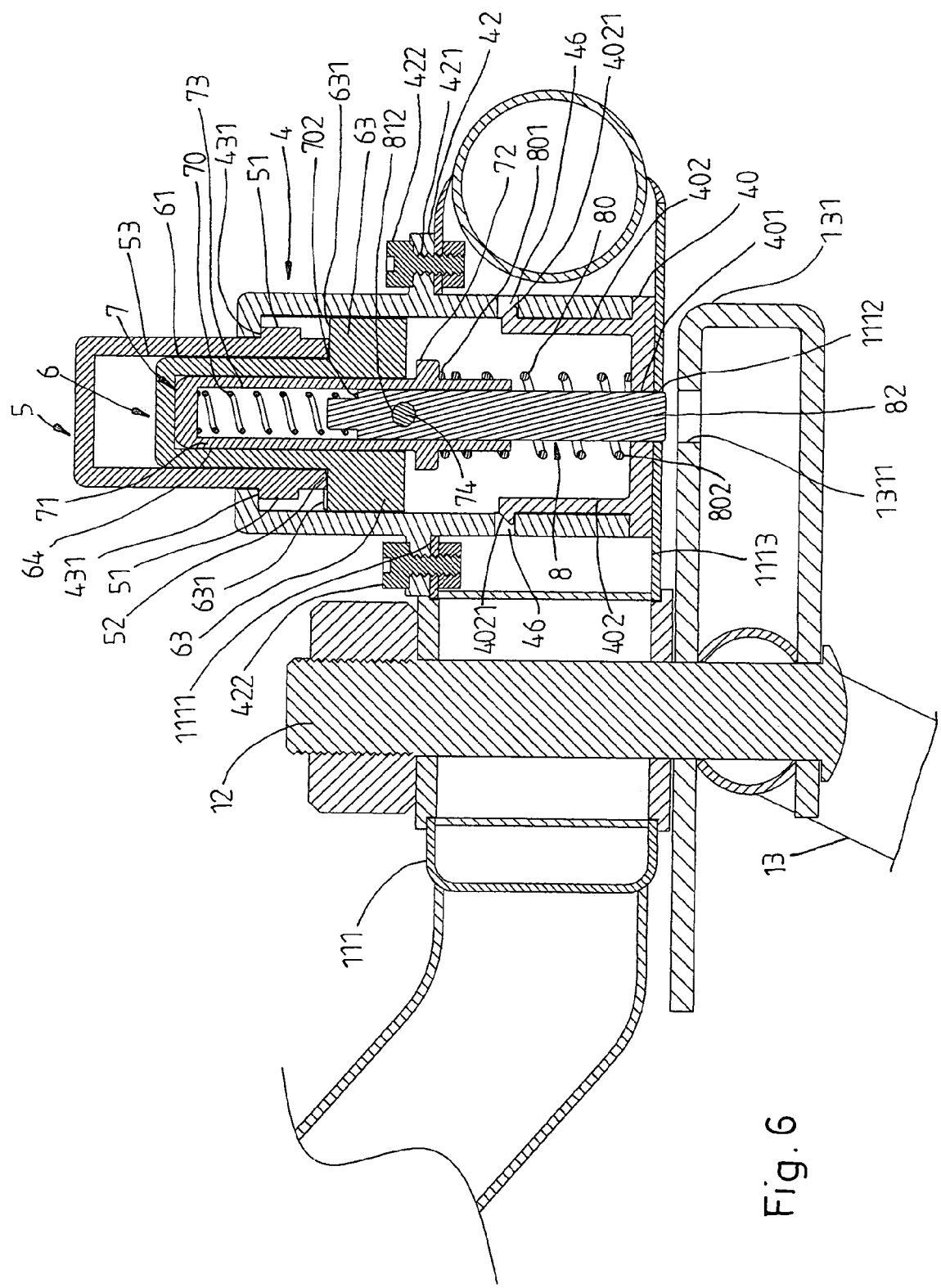
FIG. 6 is a sectional view of the present invention, showing the locking shaft disengaged from the head of the front fork.
Figure 7:
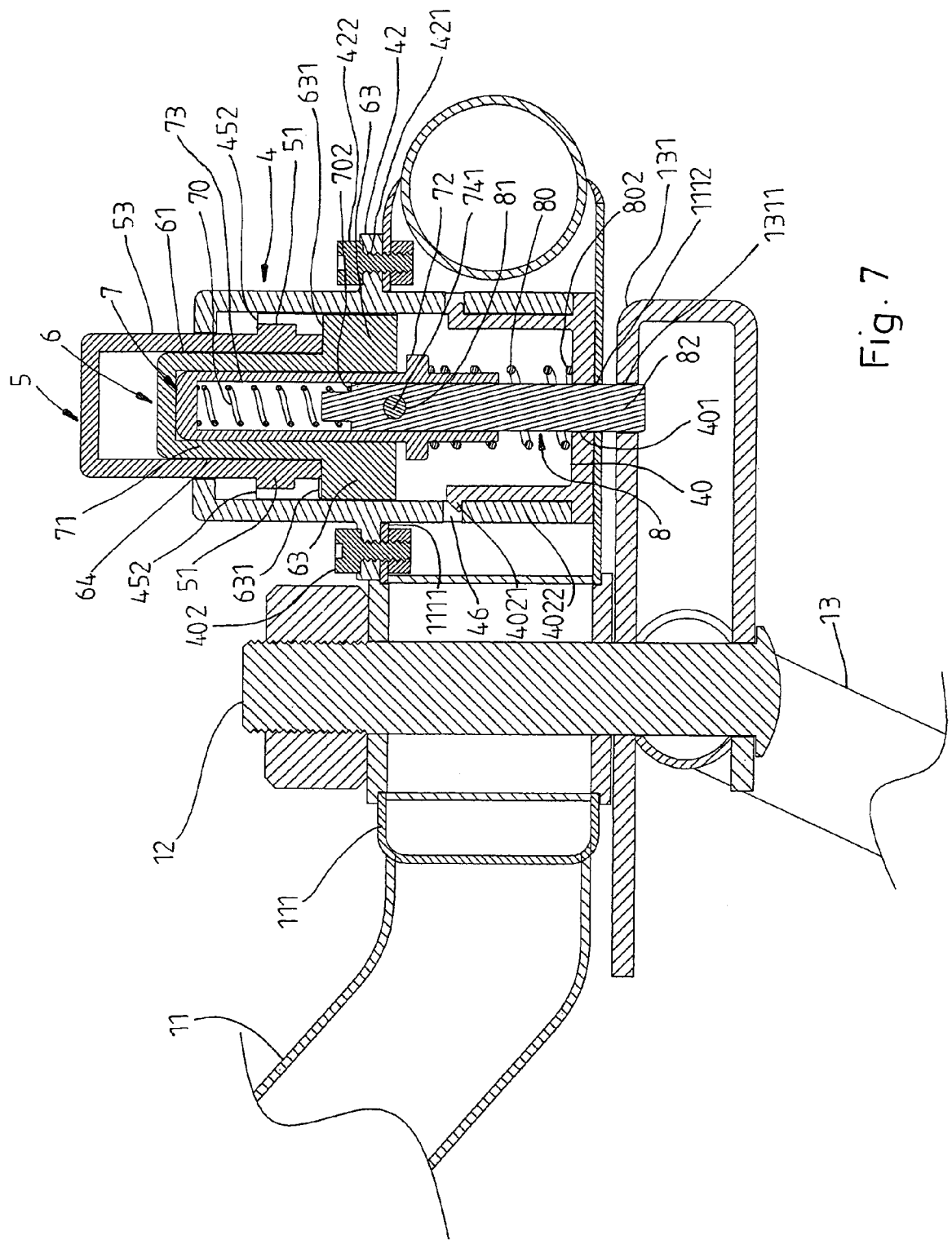
FIG. 7 is similar to FIG. 6 but showing the front fork locked.

The main features are outlined hereinafter. The jogging stroller 1 further comprises a front fork swivel control structure that can be alternatively set to unlock the front fork 13 for a swivel motion relative to the front frame tube 11, or to lock the front fork 13 and to further prohibit the front fork 13 from a swivel motion relative to the front frame tube 11 of the jogging stroller 1. The front fork swivel control structure comprises:

a holder 4, which comprises a tubular holder shell 41, which is vertically inserted through an opening 1111 at the top wall of the fixed hollow mounting frame 111 of the front frame tube 11 and which has a plurality of retaining holes 46 cut through and equiangularly spaced around the inside wall, a plurality of downwardly extending grooves 43 equiangularly spaced around the inside wall, a rib 44 and a locating block 45 disposed between each two downwardly extending grooves 43, each locating block 45 having a bottom guide face 451 and defining with the respective rib 44 a retaining groove 452 (see FIG. 5), and a mounting flange 42, which is fixedly provided around the periphery of the holder shell 41 on the middle and supported on the top surface of the fixed hollow mounting frame 111 (see FIGS. 6 and 7) and has a plurality of equiangularly spaced vertical mounting through holes 421 respectively fastened to the fixed hollow mounting frame 111 with a respective screw 422 (see FIG. 4);

a cap-like button 5 upwardly inserted through the tubular holder shell 41 of the holder 4 and protruding over the topmost edge of the holder shell 41, having a plurality of retaining blocks 51 equiangularly spaced around the periphery near the bottom side, an axially extending bottom insertion hole 53, and a plurality of bottom teeth 52 equiangularly and downwardly arranged at the bottom side around the axially extending bottom insertion hole 53;

an actuating member 6, which comprises a hollow cylindrical cap-like body 61 upwardly inserted into the axially extending bottom insertion hole 53 of the cap-like button 5 (see FIG. 6), an axially extending bottom insertion hole 64, a bottom flange 62 extending around the periphery of the bottom side, and a plurality of wedge blocks 63 respectively formed integral with and equiangularly spaced around the bottom flange 62 (see FIG. 3), each wedge block 63 having a top sloping guide face 631;

a socket 7, which comprises a socket body 71 upwardly inserted into the axially extending bottom insertion hole 64 of the actuating member 6 (see FIG. 6), a stop flange 72 extending around the periphery near the bottom side and having a diameter greater than the axially extending bottom insertion hole 64 of the actuating member 6 and disposed outside the actuating member 6, an axially extending bottom insertion hole 73, and a longitudinal sliding slot 711 cut through the peripheral wall of the socket body 71 above the stop flange 72 in communication with the axially extending bottom insertion hole 73;

a locking shaft 8, which is inserted through the through hole 1112 at the bottom wall 1113 of the fixed hollow mounting frame 111 of the front frame tube 11 into the axially extending bottom insertion hole 73 of the socket 7, having a top edge 84, a tip 81 vertically upwardly extending from the top edge 84, and a transverse locating hole 812;

a guide pin 74 is inserted through the longitudinal sliding slot 711 of the socket 7 and affixed to the transverse locating hole 812 to guide movement of the shaft 8 relative to the socket 7 along the longitudinal sliding slot 711;

a first spring member 70, which is a compression spring mounted inside the axially extending bottom insertion hole 73 of the socket 7 and stopped below the closed top side of the socket body 71, having a bottom side 702 coupled to the tip 81 and stopped against the top edge 84 of the locking shaft 8;

a bottom cap 40, which is covered on the bottom side of the holder shell 41 of the holder 4 and supported on the bottom wall 1113 of the fixed hollow mounting frame 111 of the front frame tube 11, having a plurality of upright rods 402 respectively terminating in a respective hooked portion 4021 and respectively hooked in the retaining holes 46 of the holder 4 and a center through hole 401 axially aligned with the through hole 1112 at the bottom wall 1113 of the fixed hollow mounting frame 111 of the front frame tube 11 and a lock hole 1311 at the head 131 of the front fork 13 for the passing of the locking shaft 8; and a second spring member 80, which is a compression spring sleeved onto the locking shaft 8, having a top end 801 stopped against the bottom wall of the stop flange 72 of the socket 7 and a bottom end 802 stopped against the top wall of the bottom cap 40.

The button 5 is operative to have the retaining blocks 51 be respectively stopped at the top edges 431 of the downwardly extending grooves 43 in the holder 4 (see FIGS. 5 and 6), keeping the bottom end 82 of the locking shaft 8 away from the lock hole 1311 at the head 131 of the front fork 13 for allowing a swivel motion of the front fork 13 relative to the front frame tube 11. When pressed the button 5 again to force the teeth 52 along the sloping guide faces 631 of the wedge blocks 63 of the actuating member 6, the actuating member 6 is lowered with the button 5 to force the socket 7 to compress the first spring member 70 and the second spring member 80 and to further move the locking shaft 8 downwards, and the sloping guide faces 63 of the wedge blocks 63 of the actuating member 6 are acted upon the teeth 52 to rotate the button 5 and to have the retaining blocks 51 of the button 5 be disposed below the bottom guide faces 451 of the locating blocks 45 of the holder 5 when the retaining blocks 51 of the button 5 are moved downwards over the bottom guide faces 451 of the locating blocks 45 of the holder 5, and therefore when release the pressure from the button 5, the first spring member 70 and the second spring member 80 immediately push the locking shaft 8, the socket 7, the actuating member 6 and the button 5 upwards to have the retaining blocks 51 of the button 5 be stopped in the retaining grooves 452 inside the holder 4 (see FIGS. 5 and 7), keeping the bottom end 82 of the locking shaft 8 engaged in the lock hole 1311 at the head 131 of the front fork 3 to prohibit the front fork from a swivel motion relative to the front frame tube 11. When pressed the button 5 once again to lower the retaining blocks 51 away from the bottom guide faces 451 of the locating blocks 45 of the holder 4, the sloping guide faces 631 of the wedge blocks 63 of the actuating member 6 push the teeth 52 of the button 5 to rotate the button 5 and to further move the retaining blocks 51 to the retaining grooves 452 inside the holder 4, for enabling the retaining blocks 51 to be respectively kept engaged in the retaining grooves 452 (see FIGS. 5 and 6) and the locking shaft 8 to be pushed upwardly away from the lock hole 1311 at the head 131 of the front fork 13 by the second compression spring 80 when the pressure is released from the button 5, and therefore the front fork 13 is unlocked for a swivel motion relative to the front frame tube 11 again. Therefore, simply by pressing the button 5, the user can control locking/unlocking of the front fork 13 relative to the front frame tube 11 conveniently.

As indicated above, the front fork swivel control structure of the present invention has the following features:

1. The user can use the hand or the foot to operate the button 5 to further lock/unlock the front fork 13 conveniently, allowing or not allowing swivel motion of the front wheel 2.

2. The user can selectively control the front wheel 2 between the swivel position and the non-swivel position subject to different conditions as desired.

3. When the user's hands are not free, the user needs not to bend the body and can directly use the foot to operate the button 5 to lock/unlock the front fork 13.

What is claimed is:

1. A front fork swivel control structure used in a jogging stroller comprising a front frame tube, a handlebar coupled to said front frame tube, two rear frame tubes respectively pivoted to said handlebar and spaced from said front frame tube, a front fork, which has a head pivoted to a fixed hollow mounting frame at said front frame tube by a pivot and carrying a 12 inch front wheel below said front frame tube, a rear wheel axle coupled between said rear frame tubes and carrying a pair of 15.5 inch rear wheels, and two side frame tubes bilaterally coupled between said front frame tube and said rear frame tubes, said front fork swivel control structure being alternatively set to unlock said front fork for a swivel motion relative to said front frame tube or to lock said front fork and to further prohibit said front fork from a swivel motion relative to said front frame tube, the front fork swivel control structure comprising:

a holder, said holder comprising a tubular holder shell vertically inserted through an opening at a top wall of said fixed hollow mounting frame of said front frame tube, said tubular holder shell having a plurality of retaining holes cut through and equiangularly spaced around a peripheral wall thereof, a plurality of downwardly extending grooves equiangularly spaced around the inside of the peripheral wall, a rib and a locating block disposed between each two said downwardly extending grooves, said locating blocks each having a bottom guide face and defining with the respective rib a retaining groove, and a mounting flange fixedly provided around the periphery of said holder shell on the middle and supported on said fixed hollow mounting frame, said mounting flange having a plurality of equiangularly spaced vertical mounting through holes respectively fastened to said fixed hollow mounting frame with a respective fastening member;

a cap-like button upwardly inserted through the tubular holder shell of said holder and protruding over the topmost edge of the holder shell of said holder, said cap-like button having a plurality of retaining blocks equiangularly spaced around the periphery near a bottom side thereof, an axially extending bottom insertion hole, and a plurality of bottom teeth equiangularly and downwardly arranged at a bottom side around the axially extending bottom insertion hole of said cap-like button;

an actuating member, said actuating member comprising a hollow cylindrical cap-like body upwardly inserted into the axially extending bottom insertion hole of said cap-like button, an axially extending bottom insertion hole, a bottom flange extending around the periphery of a bottom side thereof, and a plurality of wedge blocks respectively formed integral with and equiangularly spaced around the bottom flange of said actuating member, said wedge blocks each having a top sloping guide face;

a socket, said socket comprising a socket body upwardly inserted into the axially extending bottom insertion hole of said actuating member, a stop flange extending around the periphery near a bottom side thereof and having a diameter greater than the axially extending bottom insertion hole of said actuating member and disposed outside said actuating member, an axially extending bottom insertion hole, and a longitudinal sliding slot cut through the peripheral wall of said socket body above said stop flange in communication with the axially extending bottom insertion hole of said socket;

a locking shaft inserted through said fixed hollow mounting frame of said front frame tube into the axially extending bottom insertion hole of said socket and downwardly insertable into a lock hole at the head of said front fork to lock said front fork to said front frame tube, said locking shaft having a top edge, a tip vertically upwardly extending from said top edge, and a transverse locating hole;

a guide pin inserted through the longitudinal sliding slot of said socket and affixed to the transverse locating hole of said locking shaft to guide movement of said locking shaft relative to said socket along said longitudinal sliding slot;

a first spring member mounted on the tip of said locking shaft inside the axially extending bottom insertion hole of said socket and stopped between said socket body and the top edge of said locking shaft;

a bottom cap covered on said holder shell of said holder at a bottom side and supported on said fixed hollow mounting frame of said front frame tube at a top side, said bottom cap having a plurality of upright rods respectively terminating in a respective hooked portion and respectively hooked in the retaining holes of said holder and a center through hole axially aligned with the lock hole at the head of said front fork for the passing of said locking shaft and for guiding said locking shaft into engagement with the lock hole at the head of said front fork; and a second spring member sleeved onto said locking shaft and stopped between the stop flange of said socket said bottom cap.

\* \* \* \* \*